United States Patent [19]

Wilkerson

[11] 3,921,302
[45] Nov. 25, 1975

[54] BRAKE PEDAL CALIPER
[76] Inventor: Edward D. Wilkerson, P.O. Box 755 South Court, Normandy Beach, N.J. 08739
[22] Filed: June 26, 1974
[21] Appl. No.: 483,220

[52] U.S. Cl............................................. 33/169 R
[51] Int. Cl.²......................................... G01B 5/00
[58] Field of Search ..... 177/232; 73/132; 33/169 R, 33/180 AT, 192

[56] References Cited
UNITED STATES PATENTS

| 253,526 | 2/1882 | Geiger | 33/192 |
|---|---|---|---|
| 722,740 | 3/1903 | Munson | 177/233 |
| 1,422,925 | 7/1922 | Carter | 33/192 |
| 3,224,102 | 12/1965 | MacMillan | 33/169 R |

Primary Examiner—Richard E. Aegerter
Assistant Examiner—Charles E. Phillips

[57] ABSTRACT

A brake pedal caliper which compares the total distance from a vehicle floorboard of an unactuated brake pedal to the pedal reserve distance upon actuation. The caliper comprises a pair of relatively movable legs with attached feet, which define an inside caliper. An elongated coil spring is coupled to both legs so as to be responsively elongated upon relative movement of the legs. A slidable spool forms an inspection window which subdivides the spring coil turns. The window cooperates with an indicator flag to measure the adequacy of the pedal reserve of an actuated brake pedal in terms of the fractional subdivision of the spring.

6 Claims, 9 Drawing Figures

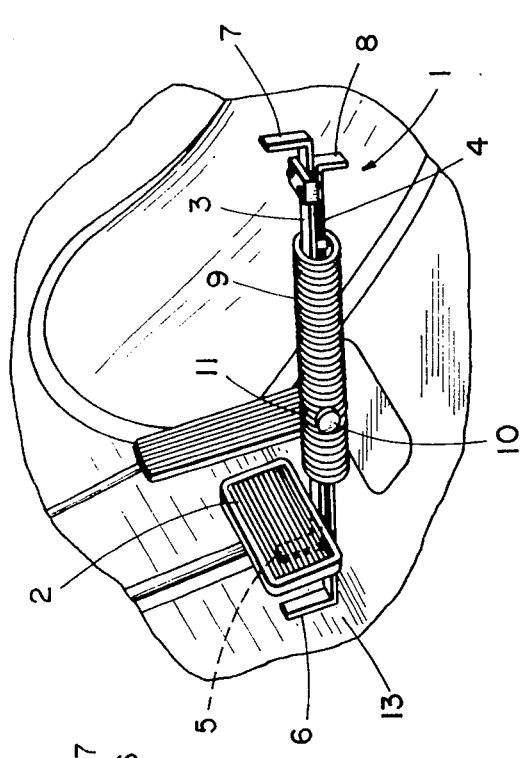

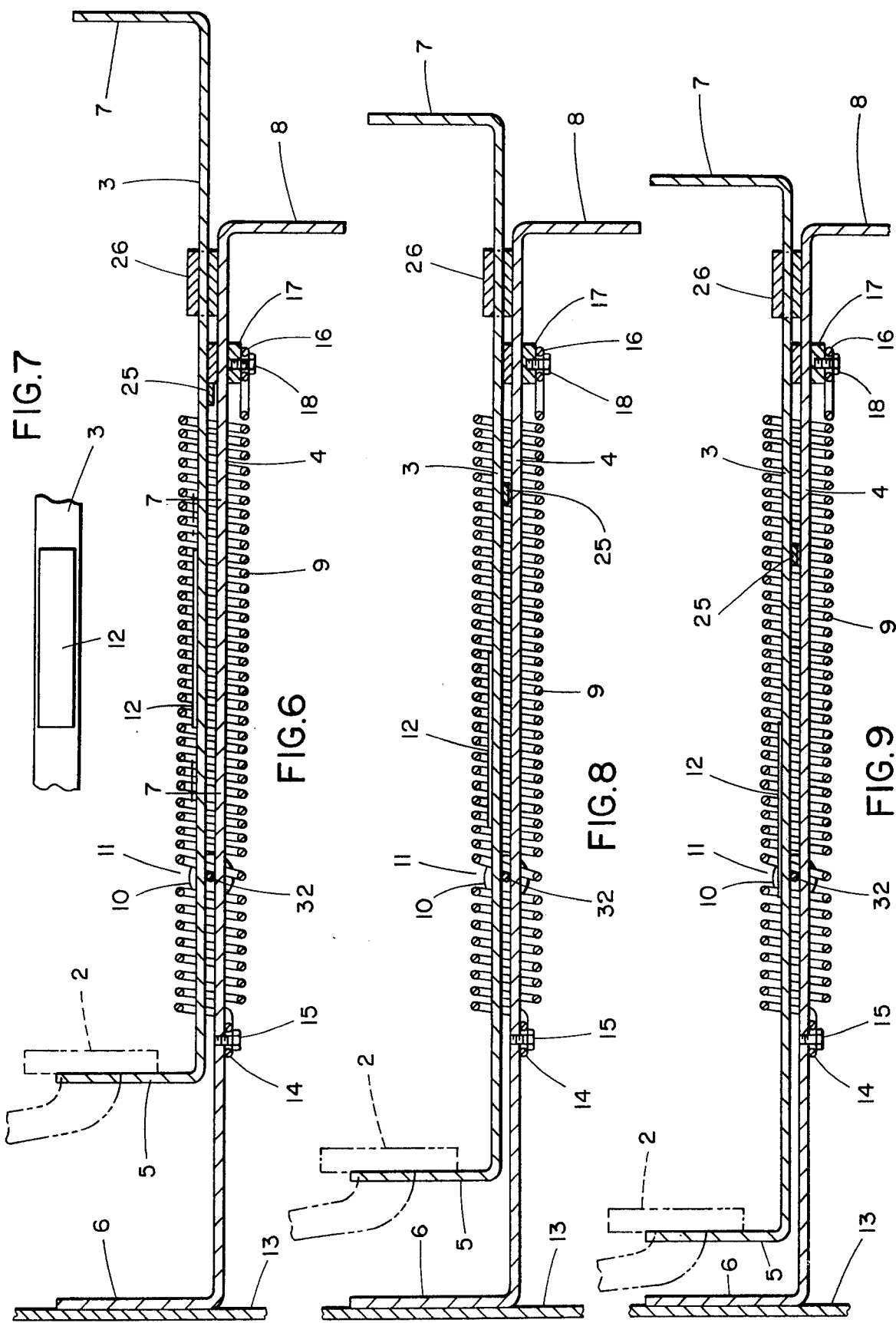

BRAKE PEDAL CALIPER

DESCRIPTION OF THE PRIOR ART

The prior art discloses a limited number of brake pedal test instruments. Such instruments are disclosed, for example, in U.S. Pat. Nos. 3,602,044, 3,602,043, 1,760,602 and 1,684,539. None of these devices contemplates the use of a subdivided resilient element, in the simple manner herein contemplated, to render a fractional indication of brake pedal reserve to unactuated brake pedal distance.

SUMMARY OF THE INVENTION

The United States Department of Transportation's current inspection standards for vehicle brake pedal reserves specifies: "When the brakes are fully applied there must be at least 20 percent of pedal travel remaining." Because of diverse pedal heights before application, it is extremely difficult, if not impossible, to determine by visual observation, when 20 percent of these unknown, diverse distances remain.

A primary object of the invention is to provide an economical and simple caliper design which will quickly and accurately register the fractional adequacy of the brake pedal reserve distance upon actuation to the unactuated pedal distance from the vehicle floorboard.

A principal structural feature for attaining this object is the use of resiliently extendible means, such as extension coil spring, having 20 percent of its extendible surface suitably marked for lengthwise distance reference.

DETAILED DESCRIPTION OF THE DRAWINGS

In order that all of the structural features for attaining the objects of this invention may be readily understood, reference is herein made to the accompanying drawings wherein:

FIG. 1 is a perspective view showing the application of the brake pedal caliper of this invention to an idle brake pedal;

FIG. 2 is a side elevation view of the caliper in which the two caliper legs are closed;

FIG. 3 is a front view of the caliper with the legs positioned as shown in FIG. 2;

FIG. 4 is a section view of the friction slide block taken along line 4—4 of FIG. 2;

FIG. 5 is a section view of the guide block taken along line 5—5 of FIG. 2;

FIG. 6 is a side elevation view in which the two caliper frames are expanded to span the distance between a vehicle floor board and an idle brake pedal;

FIG. 7 is a fragmentary view of that portion of the movable frame showing the indicator flag;

FIG. 8 is a side elevation view in which the two caliper frames are partially closed in response to an applied brake which has a proper pedal reserve; and FIG. 9 is a side elevation view in which the two caliper frames are excessively closed in response to an applied brake which has inadequate pedal reserve.

DETAILED DESCRIPTION OF THE INVENTION

Referring to FIG. 1 of the drawings, brake pedal caliper 1 of this invention is shown applied to an idle or unactuated brake pedal 2. Typically, brake pedal 2 is of the construction usually found in vehicles and, as such, is foot depressed by a driver operator so as to effect braking of the vehicle.

Caliper 1 includes as its basic elements a pair of relatively slidable and movable caliper legs 3 and 4. Caliper legs 3 and 4 are each formed with feet 5 and 6, respectively. In the application of caliper 1, as is shown in FIGS. 1, 6, 8 and 9, feet 5 and 6 establish an inside caliper measuring device between a base point of the vehicle, which is the floorboard 13, and preferably a lower surface of brake pedal 2.

The upper end of caliper leg 3 is formed with an operating or movable handle 7, and the upper end of leg 4 is formed with a stationary or holding handle 8.

A helical coil spring 9 envelops caliper legs 3 and 4. As is hereafter outlined, this spring is uniformly extensible in response to the relative movement of legs 3 and 4. This spring extension is effected by manually holding handle 8 and manually elevating handle 7. The total length of spring 9 is subdivided by spool 10, which is sandwiched between adjacent coil turns of the spring to move responsively to changes in spring length. Spool 10 separates the adjacent turns so as to provide an observing window 11 (see FIG. 3). An indicator flag 12 (FIG. 7) is affixed to caliper leg 3 so that various relative positions of legs 3 and 4 may or may not permit the observation of indicator flag 12 through window 11. When caliper feet 5 and 6 are closed, as is shown in FIGS. 2 and 3, the lower edge of indicator flag 12 may be seen through window 11.

The basic function of caliper 1 is to compare a specified fraction of the total unactuated brake pedal distance from floorboard 13 to the reserve distance from the floorboard of an actuated brake pedal.

In the operation of the device, if the proper pedal reserve, which distance is expressed as a desired fraction of the total brake pedal distance from floorboard 13, is available, then indicator flag 12 cannot be observed through window 11. If, however, inadequate reserve is measured by caliper 1, then indicator flag 12 can be observed through window 11 and the test procedure will indicate that brake adjustment is required for safety purposes.

FIGS. 2 and 3 show the relative positioning of caliper legs 3 and 4 when the space between caliper feet 5 and 6 is closed. The lower end 14 of spring 9 is anchored to floorboard supported leg 4 by screw 15. The upper end 16 of helical spring 9 is anchored to slide block 17 by screw 18.

As is shown in FIG. 4, slide block 17 comprises a pair of elements 19 and 20 which frictionally sandwich leg 4. Slide block elements 19 and 20 are held together by screws 21 and 22. The tightening adjustment of these screws determines the degree of holding friction developed between slide block 17 and leg 4.

Leg 3 supports slide block lift tab 25 (FIGS. 2, 6, 8 and 9). Lift tab 25, in the closed position of the caliper (FIG. 2), is located immediately below slide block 17. The upward movement of caliper leg 3 by manually lifting handle 7, while at the same time holding stationary handle 8, will responsively lift slide block 17 so as to elongate helical coil spring 9.

Caliper legs 3 and 4 are coupled together at their upper ends by guide and limiting block 26. The structural details of limiting block 26 are shown in FIG. 5. In particular, the block comprises a pair of elements 27 and 28 which sandwich caliper leg 3. Elements 27 and 28 are held together by screws 29 and 30. These screws are so adjusted that indicator leg 3 may be slidably moved through the central opening defined by elements 27 and 28. Slide block element 28 is welded (or otherwise rigidly fixed) to the upper end of leg 4 by welds 31. Accordingly, slide block 26 performs a dual function, namely, (1) it holds legs 3 and 4 together, nonetheless permitting leg 3 to move relative leg 4; and (2) the lower edge serves as a limit beyond which slide block 17 cannot be moved by lift tab 25.

In FIG. 6 operating handle 7 has been elevated with respect to the hold handle 8. Accordingly, slide block lifting tab 25 has elevated sliding friction block 17 so that spring 9 has been elongated. In the event that caliper foot 5 contacts the lower edge of an idle brake pedal 2 (as is shown in FIG. 6), the coil spring 9 is elongated a distance equal to the space between floorboard 13 and brake pedal 2. This is the total unactuated brake pedal distance.

In view of the fact that the total turns comprising spring 9 are subdivided by shaft 32 of spool 10, a specified proportion of the total distance between caliper feet 5 and 6 is represented by the elevation of shaft 32 in response to the extension of spring 9.

As is shown in FIG. 3, when the caliper legs are closed with feet 5 and 6 adjacent one another, the lower edge of indicator flag 12 is observable through window 11 formed by spool 10. However, the upward movement of leg 3 when operating handle 7 is lifted, elevates indicator flag 12 by an amount equal to the distance between feet 5 and 6 (FIG. 6). This distance is the distance equal to the total unactuated brake pedal distance from the floorboard. Inasmuch as spool 10 has been elevated only a specified portion of the total coil extension, such as for example, 20 percent of the total unactuated brake pedal distance, indicator flag 12 is removed from window 11.

Upon actuation of brake pedal 2 to its braking point (FIG. 8), caliper leg 3 and indicator flag 12 are moved downwardly because foot 5 engages the bottom of brake pedal 2. Spring 9 maintains its original elongation in view of the fact that slide block 17 is frictionally locked to the shank of caliper leg 4, notwithstanding the fact that lift tab 25 has been lowered in response to the downward movement of leg 3.

In view of the fact that the brake pedal reserve in the situation described in FIG. 8, as measured by the distance separating caliper feet 5 and 6, exceeds a specified fraction, such as for example, 20 percent of the total unactuated distance measured by the caliper operation of FIG. 6, flag 12 remains above window 11 and, accordingly, may not be observed. Thus, a safe brake pedal reserve is measured based upon a specified 20 percent standard.

In FIG. 9, an inadequate brake pedal reserve is indicated. It should be noted in this case brake pedal 2 is relatively closer to floorboard 13 than in the case shown in FIG. 8. Accordingly, feet 5 and 6 define a relatively small brake pedal reserve distance; and indicator flag 12 has been lowered so as to be observable through window 11. This relative position of flag 12 with respect to window 11 indicates that inadequate brake pedal reserve is present. Accordingly, safe operation of such a vehicle incorporating this brake condition requires brake adjustment.

In brief summary, the essential principle of operation of the brake caliper of this invention requires that spool 10 subdivide the total number of coil turns for spring 9 an amount equal to the specified fraction of total unactuated brake pedal distance from the floorboard considered safe. In the initial step in adjusting the caliper, a disposition of the caliper legs as is shown in FIG. 6 between an unactuated brake pedal and the floorboard, elongates the spring 9 by an amount equal to the total unactuated distance between the brake pedal and the floorboard. The specified fraction of this total distance is marked by the window defined by spool 11, and thereafter actuation of the brake pedal 2 lowers the indicator flag to a position defined by the brake pedal reserve. If the brake pedal reserve exceeds the specified fraction of total brake pedal travel, indicator flag 12 will not be observed, as is shown in FIG. 8. If, however, the brake pedal reserve is inadequate (that is, less than the specified fraction of the total distance of an unactuated brake pedal from the floorboard), then indicator flag 12 will be observed by window 11.

It should be understood that the structural arrangements described are typical of the principles of this invention, and that modifications and variations can be made without departing from the scope of the invention. For example, any resilient material that will uniformly elongate can be substituted for a coil spring.

What is claimed is:

1. A brake pedal gauge which compares a brake pedal reserve distance after brake actuation to the total distance of an unactuated brake pedal from a vehicle floorboard, comprising a pair of at least partially overlapping elongated members which are relatively movable to vary the length of overlap, an elongated resilient element uniformly extensible throughout its range of elongation, subdividing means coupled to the resilient element for subdividing the resilient element into two parts, said subdividing means providing an observing window between said two parts, a first end of the resilient member being fixed to one of the longated members which member is adapted to be supported on a vehicle floorboard, and the opposite end of the resilient element being movably coupled to the one member, an indicator element fixed to one surface of the second member and being in a predetermined position of relative alignment with the subdividing means when the two members are in a position of maximum overlap, the elongated resilient element being so positioned with respect to the one surface of the second member that only a portion of the surface of the second member is viewable through the observing window, means fixed to the second elongated member which means is also coupled to the opposite end of the resilient element so as to the cause elongation only of the resilient element upon reduction of said overlap by relative movement of the two elongated members, means coupled to the second member adapted to engage the brake pedal and movable with the brake pedal, when the one of the elongated members is supported on the vehicle floor and the means coupled to the second member is engaging the brake pedal a corresponding elongation of the resilient element will occur, upon actuation of said brake pedal, the means coupled to the second member will cause relative movement of the elongated members, whereby the indicator mounted on said one surface of the second member may or may not be viewed at the observing window of the subdividing means depending upon whether the brake pedal reserve distance is inadequate or adequate respectively.

2. The combination of claim 1 in which the resilient element is a helical coil spring.

3. The combination of claim 1, comprising a base foot fixed to one end of the first member with the base foot being adapted to engage a vehicle floorboard, and a brake pedal foot fixed to one end of the second member and adapted to engage a vehicle brake pedal.

4. The combination of claim 2 in which the subdividing means is a slidable spool sandwiched between adjacent coils of the spring.

5. The combination of claim 4 in which the indicator element is a flag positioned so as to be observed through the window when the two members are positioned with maximum overlap relative one another.

6. The combination of claim 5 in which the indicator flag is so positioned that it is observable through the window in response to inadequate brake pedal reserve.

* * * * *